(12) United States Patent
Donlagic et al.

(10) Patent No.: US 7,684,657 B2
(45) Date of Patent: Mar. 23, 2010

(54) SINGLE PIECE FABRY-PEROT OPTICAL SENSOR AND METHOD OF MANUFACTURING THE SAME

(75) Inventors: Denis Donlagic, Maribor (SI); Edvard Cibula, Starse (SI); Éric Pinet, Val-Bélair (CA)

(73) Assignee: Fiso Technologies Inc., Quebec (CA)

( * ) Notice: Subject to any disclaimer, the term of this patent is extended or adjusted under 35 U.S.C. 154(b) by 50 days.

(21) Appl. No.: 11/990,334

(22) PCT Filed: Aug. 8, 2006

(86) PCT No.: PCT/CA2006/001307

§ 371 (c)(1),
(2), (4) Date: Jul. 17, 2008

(87) PCT Pub. No.: WO2007/019676

PCT Pub. Date: Feb. 22, 2007

(65) Prior Publication Data

US 2009/0226128 A1      Sep. 10, 2009

Related U.S. Application Data

(60) Provisional application No. 60/707,536, filed on Aug. 12, 2005.

(51) Int. Cl.
*G02B 6/00* (2006.01)

(52) U.S. Cl. ......................................................... 385/12

(58) Field of Classification Search ....................... None
See application file for complete search history.

(56) References Cited

U.S. PATENT DOCUMENTS

| | | | |
|---|---|---|---|
| 5,280,173 A * | 1/1994 | Morse et al. | 250/227.23 |
| 6,738,145 B2 | 5/2004 | Sherrer et al. | |
| 2002/0159671 A1 | 10/2002 | Boyd et al. | |
| 2005/0195402 A1 | 9/2005 | May et al. | |
| 2005/0231729 A1 | 10/2005 | Lopushansky et al. | |
| 2006/0115202 A1 * | 6/2006 | Stevens et al. | 385/12 |

FOREIGN PATENT DOCUMENTS

WO    WO 02/23148 A1    3/2002

OTHER PUBLICATIONS

International Search Report issued in International Application No. PCT/CA2006/001307, dated Nov. 20, 2006.
International Preliminary Report on Patentability issued in International Application No. PCT/CA2006/001307, dated Jan. 10, 2008.

* cited by examiner

*Primary Examiner*—Sung H Pak
(74) *Attorney, Agent, or Firm*—McDermott Will & Emery LLP

(57) ABSTRACT

An optical sensor and a method of manufacturing such as sensor are provided. The sensor includes a lead optical fiber with a single piece optical element joined permanently joined to its forward end. The optical element defines a spacer with a cavity therein at one end, and a diaphragm at the opposite end. The diaphragm is flexible in response to a parameter and the sensor defines a sensing Fabry-Perot resonator.

58 Claims, 7 Drawing Sheets

SINGLE PIECE FABRY-PEROT OPTICAL SENSOR AND METHOD OF MANUFACTURING THE SAME

RELATED APPLICATIONS

This application is the U.S. National Phase under 35 U.S.C. §371 of International Application No. PCT/CA2006/001307, filed on Aug. 8, 2006, which in turn claims the benefit of U.S. Patent Application No. 60/707,536, filed on Aug. 12, 2005, the disclosures of which Applications are incorporated by reference herein.

FIELD OF THE INVENTION

The present invention relates to the field of optical sensors and more particularly concerns a miniature Fabry-Perot sensor in which internal strain is minimal and which is easy to manufacture.

BACKGROUND OF THE INVENTION

Optical fiber pressure sensors have been the topic of intense research during the last decade as they can be made very small, compact, immune to electromagnetic interference, biocompatible and can be used at elevated temperature or in a harsh chemical environment. Applications for such sensors are therefore numerous and range from combustion and jet engine controls to biomedical applications.

It is known in the prior art to provide a pressure sensor at the tip of an optical fiber. For example, published international patent application no. WO 02/23148 (WILNER et al.) shows a housing made from silicon in which the end section of a lead fiber and a silicon diaphragm are fixed. The flat cleaved lead fiber end and the diaphragm form two reflective surfaces that define a Fabry-Perot interferometer. The optical signal from the lead optical fiber is split into two paths which mutually interfere. The sum of their interference is function of the distance between the fiber end and the diaphragm position, the latter being a function of pressure.

Other sensors of this type are for example described in patents and patent applications EP 1 089 062; U.S. Pat. Nos. 4,491,590; 5,381,229; 6,539,136; 5,657,405; 6,597,820; 6,820,488; 6,823,738; US 2004/0223679; US 2005/0041905; WO 99/45352 and WO 02/23148. The following publications may also be consulted: MacPherson W. N. et al., "*Miniature fiber optic pressure sensor for turbomachinary applications*", Rev. Sci. Instr., 1999, Vol. 70 no. 3, pp. 1868 1874,); Pinet É. et al. "*Miniature fiber optic pressure sensor for medical applications: an opportunity for intra-aortic balloon pumping (IABP) therapy*", Proc. of SPIE, 2005, Vol. 5855, pp. 234-237. For all the solutions mentioned in these documents, the typical design produces a sensor that is larger than the diameter of the lead optical fiber used for its interrogation.

U.S. Pat. Nos. 4,078,432, 4,701,614, 4,918,305 and 5,193, 129 describe small micro-binding optical fiber pressure sensors. In all cases, two optical fibers are needed; one for the probing light and the other for the detected light whose intensity is dependent on the pressure applied on the sensor.

European patent EP 0 503 812 discloses a small optical fiber pressure sensor using fluorescence-quenching, suitable for example for arterial blood pressure measurements. The size of such a sensor could be made very close to the diameter of the optical fiber.

There are very few known devices where the sensor diameter is equal to the diameter of the lead optical fiber. Some examples could be found in patent and patent application EP 0 997 721, US 2004/0114848. These technologies however have their drawbacks; for example, in EP 0 997 721 the manufacturing procedure is relatively complicated and requires application of special tools and materials. In US 2004/0114848, the intrinsic Fabry-Perot sensor includes a thin film sandwiched between two fiber ends.

Other ultra-miniature pressure sensors have been reported in the literature. The paper by Cibula & Ðonlagić "*Miniature fiber-optic pressure sensor with a polymer diaphragm*", Appl. Opt. 2005, Vol. 44 no. 14, pp. 2736 2744, and Slovene patent Sl 21242 disclose an optical fiber pressure sensor with a polymer diaphragm that is not larger than the size of the optical fiber. Papers by Abeysinghe D. C et al. ("*A novel MEMS pressure sensor fabricated on an optical fiber*", IEEE Phot. Tech. Lett., 2001, Vol. 13 no. 9, pp. 993 995,), Abeysinghe D. C et al. ("*Novel MEMS pressure and temperature sensors fabricated on optical fibers*" J. Micromech. Microeng. 2002, Vol. 12, pp. 229 235,) and Totsu K. et al. ("*Ultra-miniature fiber-optic pressure sensor using white light interferometry*", J. Micromech. Microeng., 2005, Vol. 15, pp. 71 75,) all disclose pressure sensors manufactured at the tip of a lead optical fiber using photolithographic patterning techniques.

Other embodiments of miniature sensors are shown in U.S. patent application no. 2005/0062979 (ZHU et al.). The miniature sensor of Zhu is designed by first bonding a hollow tube to the end face of a lead optical fiber, and then bonding a diaphragm to the hollow tube to create a Fabry-Perot interferometer. Similar configurations, employing polymer diaphragm, was also reported by Cibula E. et al ("*Miniature fiber optic pressure sensor for medical applications*", Proc. IEEE Sensors 2002, Vol. 1 no. 12-14 pp. 711-714,) and in Slovene patent Sl 21242. One drawback of such sensors is the relative fragility of the hollow spacer, both during its manufacturing and its use. The manufacturability of the disclosed sensor is further complicated by the need to make multiple splices to join the components together, and the need to precisely adjust the length of the hollow spacer so that it provides the desired cavity length after splicing of the diaphragm.

There is therefore a need for a miniature optical sensor which alleviates drawbacks of the prior art.

SUMMARY OF THE INVENTION

In accordance with a first aspect of the present invention, there is therefore provided a method for manufacturing an optical sensor for sensing a parameter.

This method includes the steps of:
a) providing an optical element of similar transversal dimensions than a lead optical fiber, said optical element being composed of a single piece and having a first and a second end;
b) shaping the first end of the optical element to define a cavity therein opened on its first end;
c) permanently joining the first end of the optical element to a forward end of the lead optical fiber so that said optical element is supported by said lead optical fiber and projects strictly therefrom; and
d) shaping the second end of the optical element to define a diaphragm extending across the cavity, the diaphragm being flexible in response to the parameter, the diaphragm defining a first reflector of a sensing Fabry-Perot resonator within the optical sensor.

According to another aspect of the present invention, there is also provided an optical sensor for sensing a parameter. The optical sensor first includes a lead optical fiber having an end surface at a forward end thereof. A single piece optical element of similar transversal dimensions than the lead optical fiber is also provided. The optical element has a first end defining a spacer permanently joined to the forward end of the lead optical fiber, and is supported by the lead optical fiber end surface so as to project strictly forward therefrom. The spacer defines a cavity therein. The optical element also has a second end defining a diaphragm extending across the cavity, the diaphragm being flexible in response to the parameter. The diaphragm and the end surface of the lead optical fiber respectively define a first and a second reflector of a sensing Fabry-Perot resonator within the optical sensor. As will be understood by one skilled in the art, the designation of first and second reflectors is used herein as a convention for convenience of reference and does not reflect a particular order of reflection.

The present invention advantageously provides Fabry-Perot sensors where the sensing elements may have a diameter as small as or even smaller than the lead optical fiber diameter, hence the reference to a miniature device. The parameter the sensor is sensitive to may for example be pressure, force, acceleration, acoustic waves, vibrations or combinations thereof. The present invention can be particularly useful for applications where the reduced size, electromagnetic interference (EMI) insensitivity, high frequency response, high thermal or chemical stability and low drift are important concerns.

Other features and advantages of the present invention will be better understood upon reading of preferred embodiments thereof with reference to the appended drawings.

Figure 1:
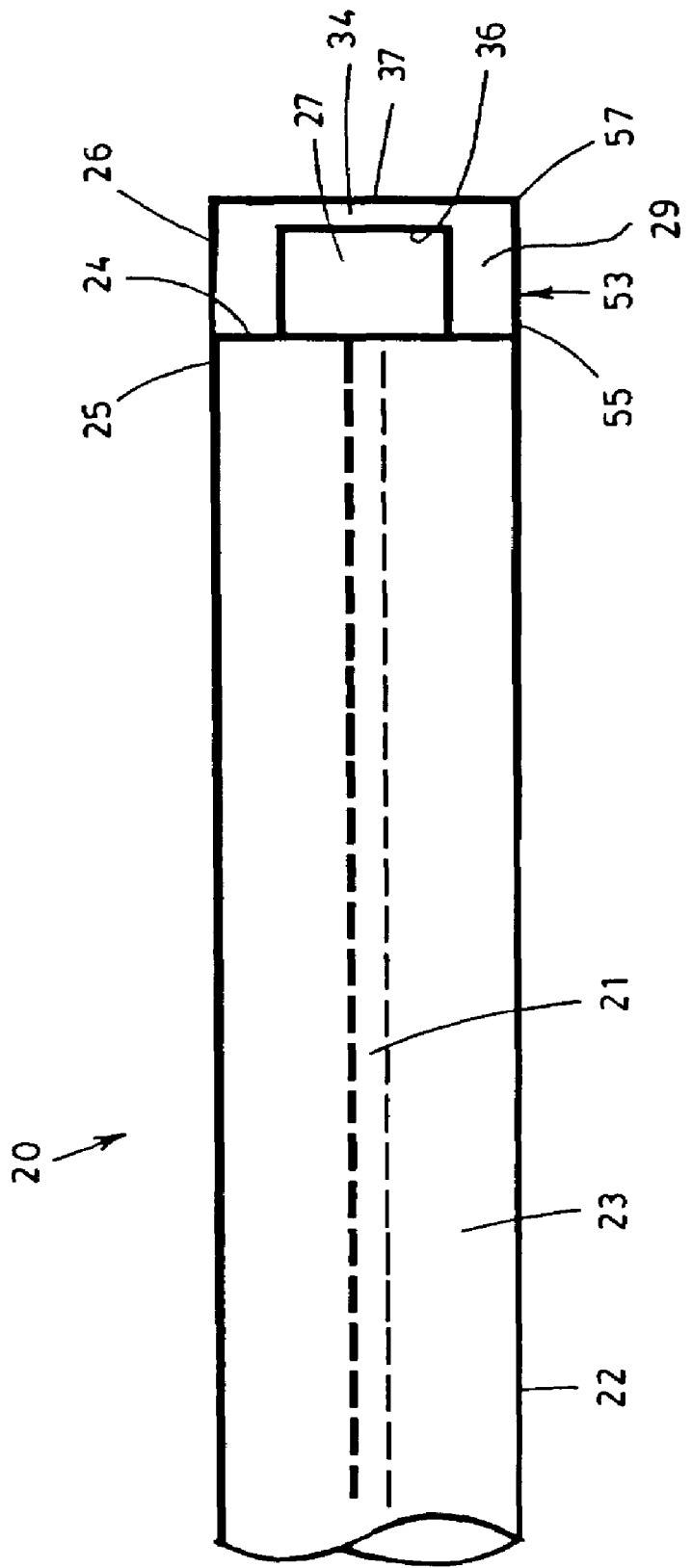
FIG. 1 is a cross-sectional side view of an optical sensor according to a preferred embodiment of the invention.

DESCRIPTION OF PREFERRED
EMBODIMENTS OF THE INVENTION

In the following description, similar features in the drawings have been given similar reference numerals and in order not to weight down the figures, some elements are not referred to in some figures if they were already identified in a precedent figure.

With reference to FIG. 1, there is shown an example of an optical sensor 20 according to an embodiment of the present invention. The sensor of the present invention is meant for sensing a given parameter. The parameter may be physical or chemical and may for example be embodied by pressure, force, acceleration, acoustic waves, vibrations, combinations thereof, or any other parameter apt to induce a displacement of a diaphragm as will be seen further below.

Optical Sensor

The optical sensor 20 of FIG. 1 first includes a lead optical fiber 22 having an end surface 24 at its forward end 25. The lead optical fiber preferably has a core 21 and a cladding 23, and is apt to guide a light signal towards its end surface 24 and guide the reflected light back in the opposite direction. It will be clear to one skilled in the art that the designation of "lead" optical fiber refers to the use of this fiber as a conduit for the sensing light signal and is not meant as representative of any particular property of the optical fiber itself. The lead optical fiber may be single mode or multimode, with a single or multiple cladding, and may be a microstructured or holey fiber. It may be made of any suitable materials such as pure silica, doped silica, composite glasses or sapphire.

The optical sensor 20 further includes a single piece optical element 53 projecting forward from the lead optical fiber 22. The optical element 53 has a first end 55 which is permanently joined to the forward end 25 of the lead optical fiber 22, and a second end 57 opposite the first end 55. The first end 55 therefore extends rearwards of the optical sensor 20 while the second end 57 projects forwards. The designations of "rearward" and "forward" are used throughout the present specification to refer to the orientation of components with respect to light coming from the lead optical fiber 22, and are not indicative of any preferential direction.

By "permanently joined" it is understood that the optical element 53 cannot be separated from the lead optical fiber without damages thereto. The two may for example be spliced or bonded together. It will further be noted that the optical element 53 and end surface 24 of the lead optical fiber 22 need not necessarily be in direct contact, and that an intermediary component such as an additional spacer (see further below with reference to FIG. 5) may be present between them without departing from the scope of the present invention.

The optical element 53 is supported by the lead optical fiber, that is, no additional component is provided to support the optical element 53 such as would for example be the case for "capillary" type sensors where a base layer supports sensor components and receives the lead optical fiber in a channel therein.

The first end 55 of the optical element 53 defines a spacer 26, while the second end 57 defines a diaphragm 34. The spacer 26 defines a cavity 27 therein. The cavity 27 is preferably an air cavity, and more preferably a vacuum or low air pressure cavity which avoids or reduces thermal effects due to gas dilatation. The cavity 27 provides for the propagation of light therethrough without undue reflections. The cavity 27 is preferably bordered by the outer wall 29 of the optical element 53, the end surface 24 of the lead optical fiber 22 at the first end of the optical element 53 and the diaphragm 34 extending across the cavity 27 at the second end of the optical element 53.

The diaphragm 34 is preferably a thin membrane and is flexible in response to the parameter to be analyzed. Preferably, either the front 37 or rear 36 surface of the diaphragm 34 forms the first reflector of a Fabry-Perot resonator, the second reflector of this resonator being defined by the end surface 24 of the lead optical fiber 22. As will be understood by one skilled in the art, the designation of first and second reflectors is used herein as a convention for convenience of reference and does not reflect a particular order of reflection. Alternatively, if the diaphragm is thin enough, the reflection from the first reflector can be observed as the sum of reflections at each of the front 37 and rear 36 surfaces of the diaphragm 34. This situation can be treated either as a double Fabry-Perot resonator or as a single resonator, as reflected light waves from both surfaces will add coherently. The final effect is that the reflected wave encounters a phase shift different from 180 degrees upon reflection, which in general does not require the use of special signal processing to measure the desired parameter(s).

By definition, a reflector of a Fabry-Perot resonator has reflective or semi-reflective properties. These properties may simply come from the interface between two different media, or be advantageously improved by providing a reflective or semi-reflective layer coating onto the appropriate surface. The end surface 24 of the lead optical fiber 22, defining the second reflector, may therefore be coated with a semi-reflective layer. The surface of the diaphragm 34 defining the first reflector may advantageously be coated with a fully reflective layer to increase light reflection. The reflective or semi-reflective layers may for example be embodied by a metallic coatings, oxide coatings or semiconductor coatings of appropriate thicknesses. Such coatings and other options for providing reflective or semi-reflective layers are well known to those skilled in the art.

A deflection of the diaphragm can for example be measured on the basis of interference of reflected light in the Fabry-Perot resonator, and an appropriate optical signal processing system can deduce therefrom a variation in the measured parameter. The optical processing of the signal is adapted to the characteristics of the Fabry-Perot resonator. It will be understood by one skilled in the art that the different interfaces in the sensor may define more than one Fabry-Perot resonator, and that appropriate signal processing will select the light from desired one. Alternatively, the light reflected within more than one pair of reflectors, defining plural Fabry-Perot resonators, may be resolved to extract information from each of them or from the resulting combination of them. Sensing by a Fabry-Perot resonator and appropriate signal processing techniques are well known to those skilled in the art and need not to be described further here.

The provision of a single piece optical element embodying both the spacer and the diaphragm is a very advantageous feature of the present invention. In prior art sensors, the diaphragm is usually a separate components joined through fusion splicing, bonding or other means to the end of the spacer, which results in structural stresses on both components. These stresses are virtually absent or minimal in the present optical sensor, which is therefore more robust and durable. Since less manufacturing stresses are induced by the sensor design, it means also that the sensor will not drift due to the slow relaxation of those stresses. In addition its manufacture is simplified, as will be seen further below. The optical element 53 can typically be between 2 and 500 μm long, and the diameter of the diaphragm is typically 10 to 200 μm, preferably between 20 to 100 μm. These dimensions are of course given by way of example and are in no way limitative to the scope of the present invention.

The optical element 53 is preferably made of at least one inorganic material, such as pure silica glass, doped silica glass, composite glass or sapphire. It may for example originate from a length of fiber such as for example a multi-mode graded index or step index optical fiber. The physical or chemical properties of the material selected need not be homogenous throughout the optical element 53 and could differ along particular axes or in different portions, for example by the provision of a distribution of dopants therein.

Figure 2:
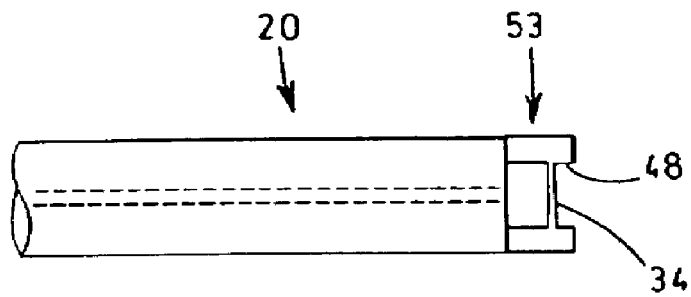
FIG. 2 is a cross-sectional side view of an optical sensor provided with a protective hollow member projecting forward of the diaphragm according to one embodiment of the invention.
Figure 3:
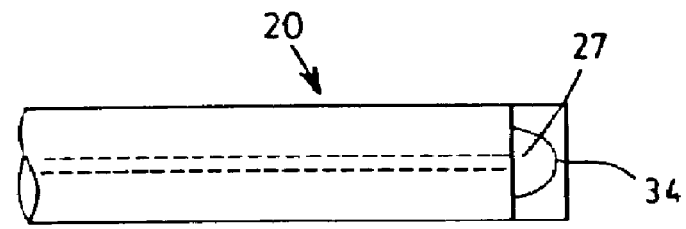
FIG. 3 is a cross-sectional side view of an optical sensor having a rounded cavity according to another embodiment of the invention.
Figure 4:
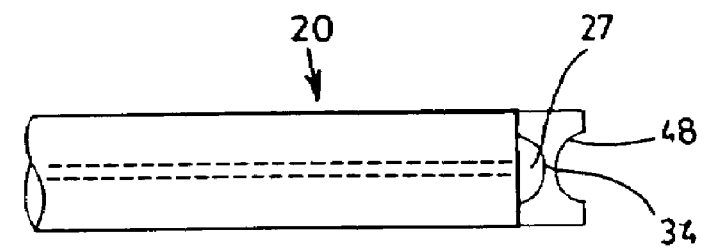
FIG. 4 is a cross-sectional side view of an optical sensor having a rounded cavity and rounded protective hollow member according to yet another embodiment of the invention.
Figure 5:
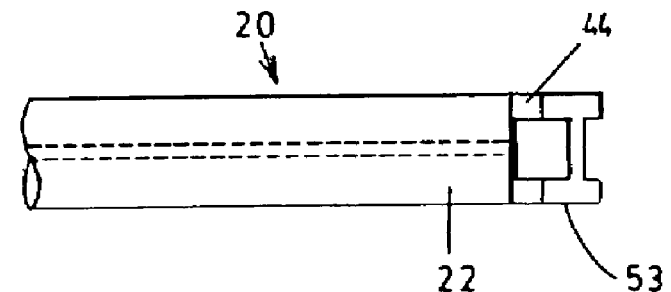
FIG. 5 is a cross-sectional side view of an optical sensor having an additional hollow spacer according to another embodiment of the invention.

The optical element 53 may take different shapes. In the embodiment of FIG. 1, it has a simple rectangular cross-sectional shape opened in the rearward direction. Referring to FIGS. 2 to 5, other exemplary shapes are shown. In the embodiment of FIG. 2, the sensor includes a hollow member 48 projecting forward of the diaphragm 34, which is also made of a single piece with the optical element 53. Such a hollow member 48 could advantageously protect the diaphragm 34 from mechanical stresses that could occur during sensor packaging or during normal use of the sensor. FIG. 3 shows an optical sensor 20 where the cavity 27 has a rounded shape, which may further increase the structural strength of the diaphragm 34. The embodiment of FIG. 4 is a mix of the two previous embodiments, where both the cavity 27 and the hollow member 48 define a rounded shape. Finally, FIG. 5 shows an optical sensor 20 similar to the one of FIG. 2 where an additional hollow spacer 44 is provided between the lead optical fiber 22 and the optical element 53.

Figure 6A:
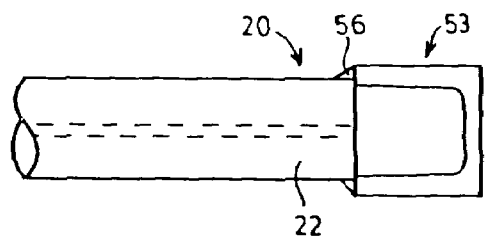
FIGS. 6A and 6B are cross-sectional side views of optical sensors where the spacer has a diameter greater and smaller than the diameter of the lead optical fiber, respectively.
Figure 6B:
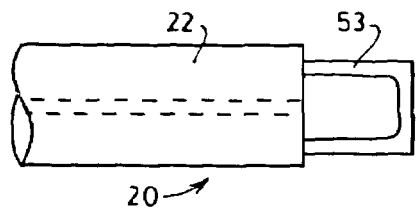
Figure 6C:
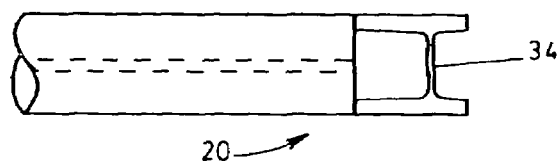
FIGS. 6C to 6H are cross-sectional side views of optical sensors having diaphragms of different shapes.
Figure 6D:
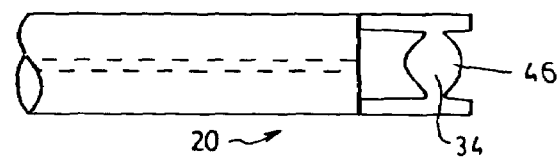
Figure 6E:
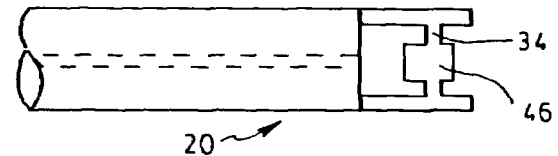
Figure 6F:
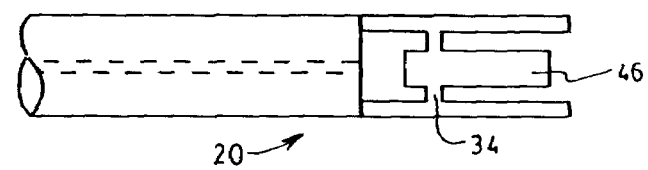
Figure 6G:
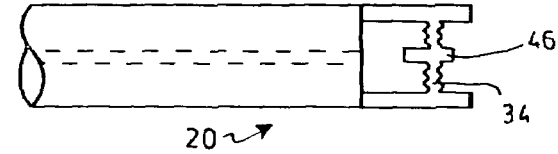
Figure 6H:
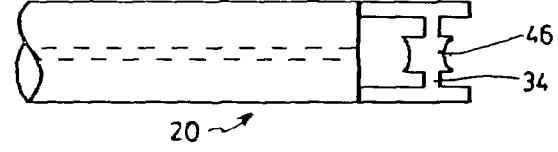

Although the embodiments of FIGS. 1 to 5 all show a spacer and diaphragm having a diameter substantially equal to the diameter of the lead optical fiber, it will be understood that the optical element 53 may have a greater diameter than the lead fiber 22 without departing from the scope of the present invention, as shown in FIG. 6A. In such case a transition surface 56 may result after joining permanently the optical element 53 to the lead fiber 22. This variant may be advantageous for some applications, especially those requiring a higher sensitivity of the sensor, and where the miniature aspect of the sensor is less of a concern. The diameter of the optical element 53 may also be smaller than that of the lead fiber 22, such as in FIG. 6B, although such an embodiment may not provide any additional advantage other than having a smaller dimension at the sensing tip or to simplify manufacturability of the optical element 53. In the case where the diameter of the optical element is significantly smaller than the one of the lead fiber 22, some packaging options could be realized to protect the sensitive part of the sensor while keeping the overall diameter similar to the one of the lead fiber 22.

Referring to FIGS. 6C to 6H, it can be seen that the shape of the diaphragm 34 itself may also be used to provide additional advantageous features according to other variants of the present invention. For example diaphragms 34 with non-uniform or corrugated surfaces could be used. Corrugated diaphragm can provide a higher overall sensitivity of the corresponding optical sensor 20 and relax internal stress leading to better sensor stability. For instance, the diaphragm 34 may be provided with a protuberance 46 protruding both backward and forward (or only inward, not shown in the figures) from its central portion as shown in FIGS. 6D to 6H. Different shapes can be given to such a protuberance 46, which may advantageously act as an inertial member, making the optical sensor 20 more sensitive to axial acceleration, to acoustic waves or to vibrations. The protuberance 46 is preferably defined by an increased thickness of the diaphragm 34 in its central portion. The presence of this protuberance 46 can also help to reduce deformations in the central portion of the diaphragm 34 so that it retains a more or less flat surface, especially when the diaphragm 34 is deflected, that helps to maintain the visibility of the Fabry-Perot within the whole range of the operation of the optical sensor 20.

Figure 9:
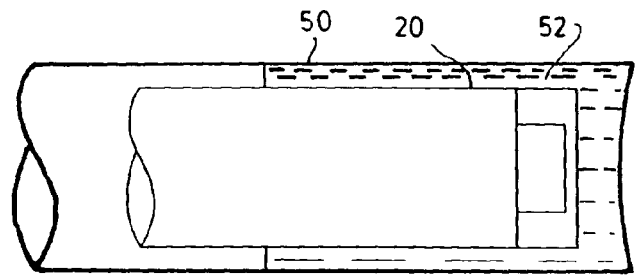
FIG. 9 is a cross-sectional side view of an optical sensor according to an embodiment of the present invention packaged in protective tubing.

Referring to FIG. 9, in accordance with another embodiment of the invention, the optical sensor according to any of the variants discussed above may be packaged in a protective tubing 50, preferably of a size comparable to that of the optical sensor. The protective tubing may be made of metal, ceramics, polymers or any other appropriate material. Such tubing is preferably flexible but may also be rigid, especially for applications where an ultra-miniature size is not a critical issue. As shown in FIG. 9 the optical sensor 20 is preferably slightly retracted inside the protecting tubing 50, not too far from its opening in order to allow stimulus transduction to the sensor while offering an improved protection. The protective tubing may enclose the optical sensor 20 partially or completely, and preferably encloses the entire sensor and a section of the lead optical fiber. It may be filled with a substance 52 selected to transduce the external stimulation to be detected by the sensor while still providing an additional protection for the most fragile exposed parts thereof. Example of appropriate substances include a flexible polymer such as polyurethane, soft rubber or the like, a gel such as silicone gel or hydrogel or the like, a liquid such as mineral or organic oils, water or other appropriate liquids such as the ones with high viscosity, with high surface tensions or liquids or polymers that will preferably not be dissolved in the external medium where the disclosed sensor will be used. For liquids, it is worth mentioning that due to the ultra-miniature size of the sensors obtained in numerous applications of the present invention, the liquids could easily remain trapped inside the protecting tubing simply due to surface tensions and capillary effects. The selection of appropriate liquids, appropriate protecting tubing material and tubing internal diameter close enough to the sensor outer diameter will thus be oriented preferably in order to maximize those capillary effects, thereby keeping the substance inside the protecting tubing. It is worth mentioning that in some cases, especially those involving flexible polymers, the substance 52 can also act as protecting tubing 50 providing additional protection for the optical sensor tip while insuring also transduction to the sensor 20 of the external stimulation.

As will be further explained below, the manufacturing of optical sensors according to the present invention preferably include fusion splicing of the different components, which occurs at elevated temperature where the polymeric cladding that usually protects the commercially available optical fibers, can not survive. As a consequence, when using standard fusion splicers there is usually at least about 0.2 to 1 cm of optical fiber that is stripped from its polymeric buffer that usually protects mechanically the glass from scratches and micro-cracking. However when using metal coated fibers instead of polymer coated fibers this exposed glass distance can advantageously further be reduced since metal could survive higher temperature. Once fusion splicing is performed, the exposed glass could be recoated to protect bare section from micro-cracks and mechanical damages. It is worth mentioning that the transduction substance could also advantageously be used to protect the sensor and the most fragile part of the tip of the lead optical fiber. Substances that do not degrade the material of the lead optical fiber should thus preferably be selected.

It is additionally worth mentioning that the protective packaging mentioned above could also present interesting advantages for good stimulus transduction with increased protection of the sensitive and likely to be fragile part of the sensor. When used in a packaging similar to the one shown in FIG. 9, the optical sensor could readily be used as a micro-pressure or micro-force sensor. The portion between the sensor tip and the protective tubing could act as a buffer section against stimulus which otherwise would have been exceeding the range of the sensor, and could have caused its destruction.

The additional protective packaging could finally advantageously be well suited to applications such as for instance medical applications where the size of the sensor, its immunity to EMI, its chemical inertness and biocompatibility, its high sensitivity as well as its low drift are crucial advantages. A potential very interesting application of such packaging would be for instance ultra-miniature instrumented catheters suitable for instance for paediatric or small animals' surgery applications. It is worth mentioning that other additional protective packaging could be designed and used in other applications without limiting the scope of the described preferred packaging and application.

Alternatively other similar designs may for instance be implemented where the end-tip of the package could be filled with a substance that swells or shrinks in presence of a given analyte, such as hydrogels or similar products capable of swelling in presence of water or possibly organic vapors or solvents. Such packaging, possibly modified compared to what is schematically illustrated in FIG. 9, could thus be used to make the ultra-miniature Fabry-Perot fiber optic sensor described in the present invention, sensitive to humidity or volatile organic compounds. Numerous designs and applications could be derived from this concept such as for instance the use of a substance that swell or shrink with temperature variations, hence making the sensor sensitive to temperature. Packaging designs variations to separate for instance interferences from temperature and external pressure will be obvious to the people known in the art. Different transduction mechanisms could be used to make the sensor sensitive to other stimuli.

Each of the lead optical fiber and the optical element may advantageously be made from pure silica, doped silica glass, composite glass as well as from sapphire, the latter being particularly suitable for extreme high temperature applications.

The design and characteristics of a given optical sensor according to the present invention are preferably tailored to the target application thereof. Highly sensitive sensors suitable for measurements of lower and higher industrial pressures may be achieved. A glass-only sensor designs allow for good temperature and chemical stability and provide resistance to other environmental influences. Since the materials suggested above are inert and very stable, extremely low drift with time, outstanding accuracy and consistent sensor performances are achievable. Due to the small size and the nature of these materials, the resulting sensor presents low temperature dependence. This feature is of particular interest not only for applications where a miniature size is essential, but also where sensor stability and precision are crucial. The miniature size of the sensor allows by design a high frequency dynamic response which is of great interest for monitoring fast parameter variations such as pressure explosion propagating wave or high frequency acoustic waves. As this is the case for all-fiber optic sensors, optical sensors according to the present invention are completely insensitive to electromagnetic interferences and are intrinsically safe. They therefore could operate perfectly in electromagnetic noisy or hazardous environments such as encountered in numerous industrial, chemical or medical applications. Sensors according to the present invention can also be well suited for demanding applications such as oil well down-holes or jet engines pressure monitoring where high pressure and temperature are present. They could be also very useful in challenging fields such as biology (microbiology, genetics . . . ), medicine (paediatrics, diagnostic, patient monitoring or animal testing . . . ), chemistry (microwave chemistry, polymer processing . . . ) and physics (aerospace, micro-fluidics, micro-robotics . . . ). As many sensors may be packed in a very small volume, several sensors could be arrayed and, provided an adequate multi-channels optical interrogation unit is used to read the Fabry-Perot resonators, incredibly localized surface pressure distribution could for instance be measured, offering the opportunity for unique micro-sensing applications. The applications mentioned above are naturally non-limitative examples.

Manufacturing Method

In accordance with another aspect of the invention, and with reference to FIGS. 7A through 7E, there is also provided a method for manufacturing an optical sensor for a given parameter as described above.

Figure 7A:
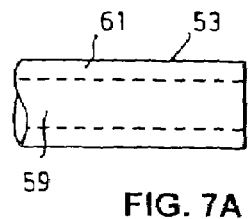
FIGS. 7A to 7E illustrate steps of a method for manufacturing an optical sensor according to another aspect of the invention.
Figure 7B:
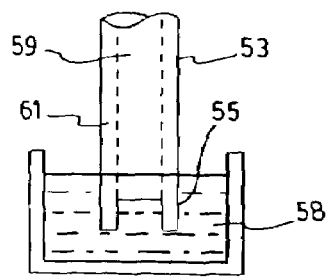
Figure 7C:
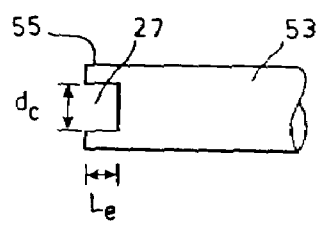

The method of the present invention first includes steps of providing an optical element 53, which will embody the sensor (FIG. 7A), and shaping (FIG. 7B) a first end 55 thereof to define an opened cavity 27 (FIG. 7C). The optical element has a second end 57 opposite the first end 55 which will be shaped to define the diaphragm, as will be defined further below. The optical element 53 may be appropriately prepared prior to etching, such as by cleaving one of both its ends to provide flat surfaces, and/or by polishing these surfaces to improve flatness. The optical element 53 is composed of a single piece, and may for example be embodied by a length of fiber. It will be understood that is this context, the term "fiber" is used in the general sense to designate any appropriate elongated structure in which light may propagate or not, and is not limited to traditional light guiding structures. The fiber providing optical element 53 is not necessary an optical fiber but should be selected by its ability to be shaped at least one end. Preferably, shaping of the first end 55 of the optical element is accomplished by etching, and the optical element 53 has an etchability profile selected to promote the formation of the cavity therein. For this purpose, the fiber preferably has an inner portion 59 and an outer portion 61, the outer portion 61 having an etchability rate lesser than the etchability rate of the inner portion 59. This may be accomplished by providing an appropriate distribution of dopants in either the inner 59 or outer 61 portion of the optical element 53, or both. The inner 59 and outer 61 portion may or may not be embodied by the core and cladding of a light-guiding optical fiber. In one embodiment, the optical element 53 could simply be a multi-mode graded index or step index optical fiber.

Referring to FIG. 7B, the etching of the first end 55 of the optical element 53 is carried out in an appropriate etching medium 58, which maybe in a liquid or vapor phase. The etching medium 58 and the nature and distribution of doping elements in the optical element 53 are selected to remove the inner portion 59 of the optical element at higher rate than its outer portion 61. For example, a step index or graded index multimode silica fiber having an inner portion 59 embodied by a core doped with $GeO_2$ can be used in combination with HF acid as an etching agent. Other common dopants known in the art, such as but not limited to $TiO_2$, $P_2O_5$, $B_2O_3$, $Al_2O_3$, $Na_2O$, $K_2O$, CaO, MgO, BaO, PbO, $Bi_2O_3$, $Fe_2O_3$, fluorine, iodine and lanthanides oxides (such as ytterbium, erbium . . . ) etc. can be used for the doping of the core 59 as well. In this case, typical appropriate etching media in the liquid phase include hydrofluoric acid (HF) or hydrofluoric acid (HF) buffered with ammonium fluoride ($NH_4F$), water solution of ammonium fluoride ($NH_4F$), and in the gaseous phase include $C_2F_6$, $CCl_2F_2$ etc. Alternatively, the cladding 61 of the fiber may be doped instead of its core 59, in which case an etching medium causing the selective removal of the non-doped core 59 shall be used. Such a combination could be a fiber with a pure $SiO_2$ core 59 and a $GeO_2$ doped cladding 61 with HF acid buffered with $NH_4F$ as an etching medium 58.

As shown in FIG. 7C, the etching process creates a cavity 27 opened on the first end 55 of the optical element 53, and the diameter $d_c$ of this cavity 27 is approximately equivalent to the diameter of the inner portion 59 of the optical element 53, typically the fiber core. As will be seen further below, in the final form of the optical sensor the diameter of the cavity bottom also determines the diameter of the diaphragm. It will be further noted that the walls of the cavity may have a slight slope due to the anisotropic etching of glass (not shown in the figures). The etching of the first end 55 of the optical element 53 is preferably timed and stopped when the etched length $L_e$ of the cavity is slightly longer than the desired length $L_c$ of the Fabry-Perot resonator. This last length depends on the signal processing system that will be used with the optical sensor and on sensing application, and typically ranges from 1 µm to 500 µm. Cavity lengths outside this range are also possible.

Figure 7D:
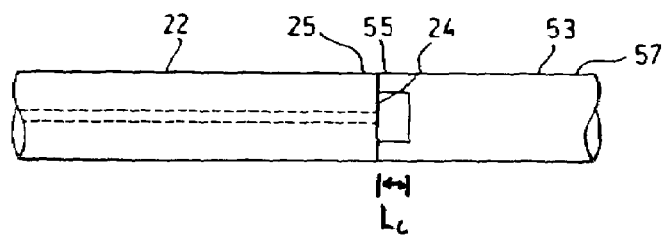

Referring to FIG. 7D, the first end 55 of the optical element 53 is next permanently joined to the forward end 25 of a lead optical fiber 22. As mentioned above, the lead optical fiber is apt to guide a light signal towards its end surface 24 and guide the reflected light back in the opposite direction. It may be single mode or multimode, and may be made of any suitable materials such as pure silica, doped silica, composite glasses or sapphire.

The permanent joining of the optical element 53 to the lead optical fiber 22 is preferably achieved through splicing, which may be accomplished with a standard optical fiber fusion splicer. Standard requirements known in the art should preferably be maintained in order to have good splicing results. One such requirement consists of making sure that the end-faces of both fibers to be spliced should be perfectly cleaved with smooth surface perpendicular to the fiber axis. Both the lead optical fiber 22 and the optical element 53 may for instance have an outer diameter of 125 µm or less. Larger fiber diameters could also be used, especially if higher sensitivity is desired, as required for instance for medical or acoustical applications. Optionally, fibers having different diameters could be spliced, resulting in an optical sensor such as shown in FIG. 6A. In that case it is usually beneficial to have a larger diameter for the optical element 53 since this will be helpful to increase the final wall thickness, to improve mechanical resistance, as well as to increase the final diaphragm diameter for improved sensor sensitivity. For such an embodiment, a fusion transition 56 at the interface between the two fibers may be created during the fusion splice. Preferably, both the lead optical fiber 22 and the fiber optical element 53 may have a diameter in the range of 50 to 500 µm, with core sizes between 20 and 475 µm. Fibers having dimensions outside of those ranges could also be used.

Both reflectors of the Fabry-Perot reflector, embodied by the end surface of the lead fiber on one side and the inside of the cavity of the optical element (which will embody the rear surface of the diaphragm in the finished sensor) may be provided with a reflective coating prior to their respective splicing. The coating on the lead fiber side should be semi-reflective, whereas the coating on the diaphragm could also be fully reflective coating such as the one obtained with thick metallic coating (such as Cr, Al, Ag, Au, Ti and the like). Such coatings that could improve the finesse or level of back reflected light of the Fabry-Perot resonator could be obtained using various deposition techniques. Thin metallic coating (e.g. titanium and the like) or preferably oxides coating (e.g. $TiO_2$, $ZrO_2$, $Ta_2O_5$, $Al_2O_3$ and the like) or semiconductor thin coating (e.g. silicon nitride and the like) could be used for such purposes in single or multiple layers.

Figure 7E:
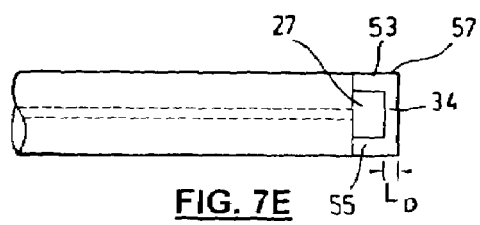

The present method next step includes a step of shaping the second end 57 of the optical element 53 to define a diaphragm 34 extending across the cavity 27, as shown in FIG. 7E. This may be accomplished in a variety of manners. In one embodiment of the invention, the shaping of the optical element 53 includes a sub-step of cleaving its forward end to a predetermined length $L_D$, for example at a distance between 5 and 100 µm away from the forward extremity of the cavity 27. A tight control of the length $L_D$ is preferable as the results of this cleaving process may have an important impact on the sensor performances. Cleaving may be performed using standard cleaving mechanical tools (scribe and break, ultrasonic cleaving, etc.) or by other techniques known in the art, such as for example $CO_2$ laser cleaving techniques. With such techniques, if appropriate visual diagnostic and displacement tools are implemented, a precise and reproducible cleave could be obtained, which could be very useful if batch processes are established in order to reduce production costs of the sensor. If a good control of the cleaving is achieved, further shaping of the diaphragm may not be necessary and a functional sensor could be obtained from this step. Since the minimum desired thickness of the diaphragm obtained from cleaving is rarely bellow 2 to 5 µm (otherwise the risk of breaking the diaphragm during cleaving is usually too high and precise control over mechanical cleave positioning is limited), high pressure sensors (such as 0-100 MPa) could be produced directly at that sub-step. For increased sensitivity sensors manufacturing, the following sub-steps are usually necessary.

Figure 8A:
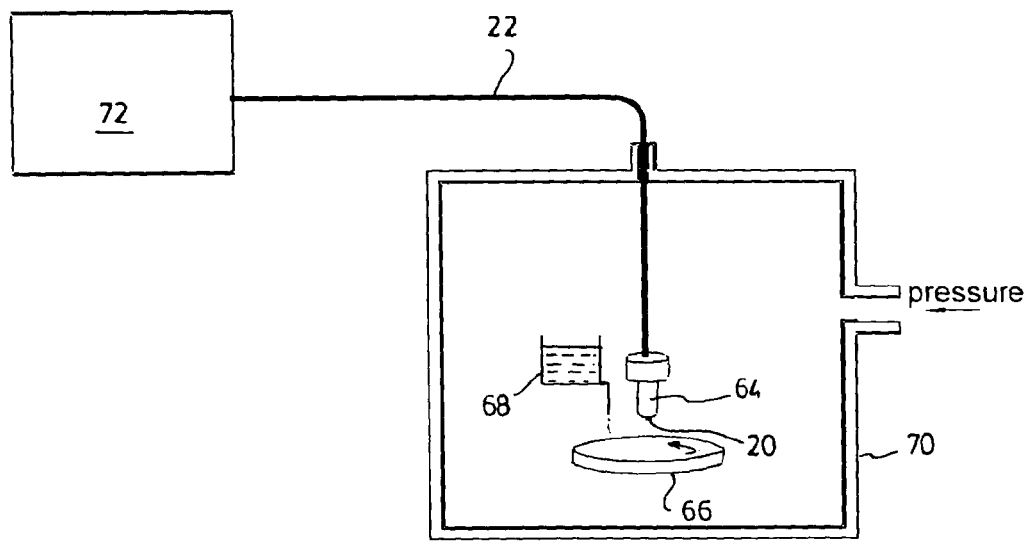
FIG. 8A is a schematized illustration of an experimental set-up to perform a polishing step according to a preferred embodiment of the invention.

The cleaving of the second end 57 of the optical element 53 may be replaced or followed by a mechanical polishing sub-step. Through an appropriately controlled polishing, the length $L_D$ of the diaphragm may be reduced down to about 1 to 5 µm. Standard polishing techniques may be used with special care of the sensitive and brittle parts of the sensor. As shown in FIG. 8A, the polishing sub-step is preferably realized by mechanically maintaining the sensor 20 into a fiber optic connector ferrule 64 placed perpendicularly to a preferably rotating polishing surface 66 such as polishing papers of different grit-sizes. For example, polishing paper of 1 to 3 µm grit-sizes may be first used followed by a 0.3 to 0.5 µm grit-size paper for the last micron. Water, alcohol or another polishing medium 68 could advantageously be used for a surface finish of better quality. For measurements of low pressures, such as for example required for most medical applications, diaphragm thickness even smaller than achievable with the technique described above may prove necessary. In such a case, further control of the polishing sub-step may be achieved by performing it in a pressurized vessel 70, and connecting the lead optical fiber 22 to an optical interrogation unit 72 which measures the response of the sensor 20 according to pressure variations imposed into the pressurized vessel 70. Different setups could of course be considered. The signal conditioning system 70 may be based on single wavelength, multiple wavelengths or even white light interferometry technologies such as available commercially. The polishing sub-step is ended once the sensor sensitivity reaches a targeted value.

Figure 8B:
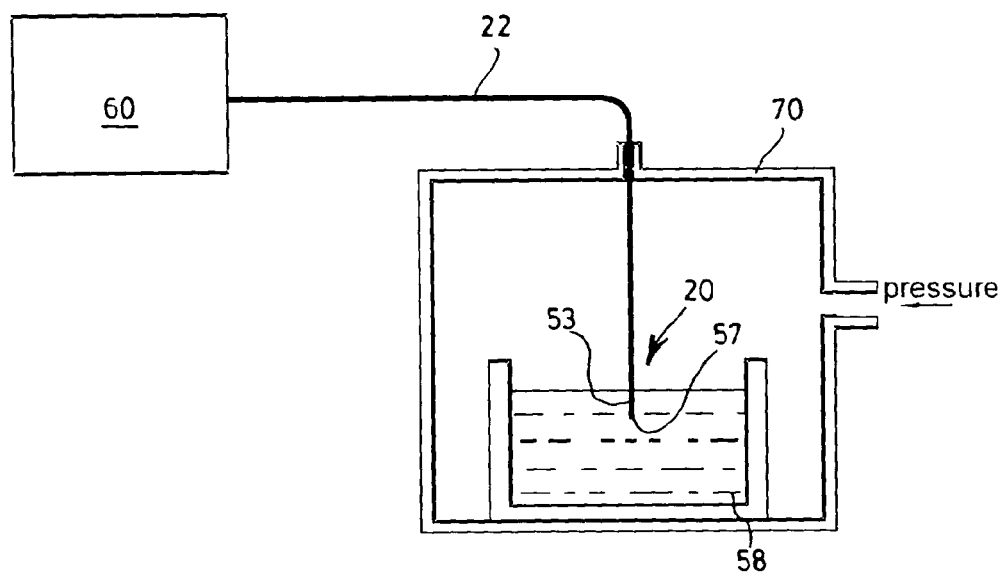
FIG. 8B is a schematized illustration of an experimental set-up to perform an etching step according to a preferred embodiment of the invention.

For certain pressure ranges, the controlled polishing described above may be sufficient to shape the diaphragm to the desired thickness. For applications requiring a particularly high sensitivity, the shaping of the diaphragm may further include an etching sub-step. Referring to FIG. 8B, an exemplary set-up for performing such an etching of the second end 57 of the optical element 53 is shown. An appropriate etching medium 58 is prepared and the second end 57 of the optical element 53 is dipped therein. The etching medium 58 may for example be embodied by HF (unbuffered) or buffered HF when the optical element 53 has a pure silica core. The etching medium 58 is preferably selected according to the physical characteristics of the optical element 53, as explained above with reference to the etching of the first end of the optical element. The etching medium could be in liquid or gaseous form.

In the embodiment of FIG. 8B, the lead optical fiber 22 is connected to an appropriate signal conditioning system 60 which interrogates the optical sensor 20 during this process. A device similar to the one embodying the optical interrogation unit 72 of FIG. 8A could be used. Different setups could of course be considered. The optical sensor 20 is enclosed together with the etching medium 58 in a pressurized vessel 70 in which pressure is preferably cyclically changed, within the target sensor pressure range (or only in part of this pressure range). The response of the optical sensor 20 is observed by the signal conditioning system 60 in real time. As the diaphragm is etched by the etching medium, its thickness decreases and its sensitivity increases. When the desired sensitivity and/or pressure range is achieved, the optical sensor 20 is removed from the etching medium 58 and neutralized. This embodiment allows for arbitrary sensitivity and pressure range of the optical sensor while it assures good repeatability of its manufacturing process. Such a process could of course be performed in batches with good process control. A well monitored control of the shaping of the diaphragm can result in a diaphragm thickness $L_D$ close to or bellow 1 µm, which can provide very high sensor sensitivity. Such very high sensitivity is advantageously useful for applications where good resolution as well as good accuracy is required.

The use of complex doping profiles in the optical element combined with selective etching of the diaphragm may also be used to give the diaphragm a particular shape. According to a preferred embodiment of the invention, the diaphragm may advantageously be shaped so as to define a protective hollow member 48 projective from its forward end, as shown in FIGS. 2, 4, 5, 6C though 6H. In other words the flexible portion of the diaphragm 34 is in effect "retracted" inside the sensor still within a single piece structure. Such a protective hollow member 48 could thus advantageously protect the flexible portion of the diaphragm 34 from mechanical stresses that could occur during sensor packaging or during normal use of the sensor. The flexible, central portion of the diaphragm 34 is preferably as flat as possible in order to allow a good quality Fabry-Perot resonator.

Alternatively, a slightly convex shape (see diaphragm 34 of FIG. 6H) could also be used in order to produce a better flat surface once the diaphragm is deflected. Such shape could also advantageously be used to refocus the light into the center part of the lead fiber and thus to increase the light injected back into the lead fiber.

In one optional variant of the invention, the outer surfaces of the obtained sensor may be coated with an absorbing or reflecting layer to optically isolate the cavity from surrounding, avoiding external light intrusion. Such coating could also be used as an additional mechanical protection of the diaphragm surface preventing scratch damages or micro-cracks propagation. An anti reflective coating could also be applied on the front surface of the diaphragm if it its use as a Fabry-Perot reflector is not desired. Such external coating could thus simplify signal processing.

In accordance with another preferred embodiment of the invention, a hollow additional spacer 44 (see FIG. 5) may be provided at the forward end of the lead optical fiber prior to attaching the optical element thereto. The additional spacer may be obtained by permanently joining a spacer element to the forward end of the lead optical fiber, preferably through splicing, and shaping this spacer element to form a hollow spacer. The shaping may be accomplished through etching using a similar procedure as explained above. Alternatively, the additional spacer may be obtained by directly shaping a portion of the extremity of the lead optical fiber to define the appropriate structure.

One advantage of the provision of an additional spacer is that after its manufacture, a semi-reflective coating as mentioned above may be deposited on the end surface of the lead optical fiber. It is also worth mentioning that in order to avoid fusion splicing on coated surfaces and when the presence of coatings jeopardize the high quality bond strength or the hermeticity of the assembly, the two spacer surfaces involved in the bond can be cleaned from coatings by polishing or other mechanical or chemical procedure prior attaching.

Another advantage of the provision of an additional spacer is offered by the opportunity to have an inwardly curvated shape (towards the lead fiber) of the cavity section next to the lead fiber. Such a design is of particular interest for embodiments with a cavity fiber section diameter greater than the lead fiber diameter, as already described for sensor embodiments with wider diameter and increased sensitivity.

The total length of the portion of the sensor projecting from the optical fiber in the finished sensor will preferably reside within range between 2 and 750 μm. However embodiments outside this range are also possible.

Figure 10:
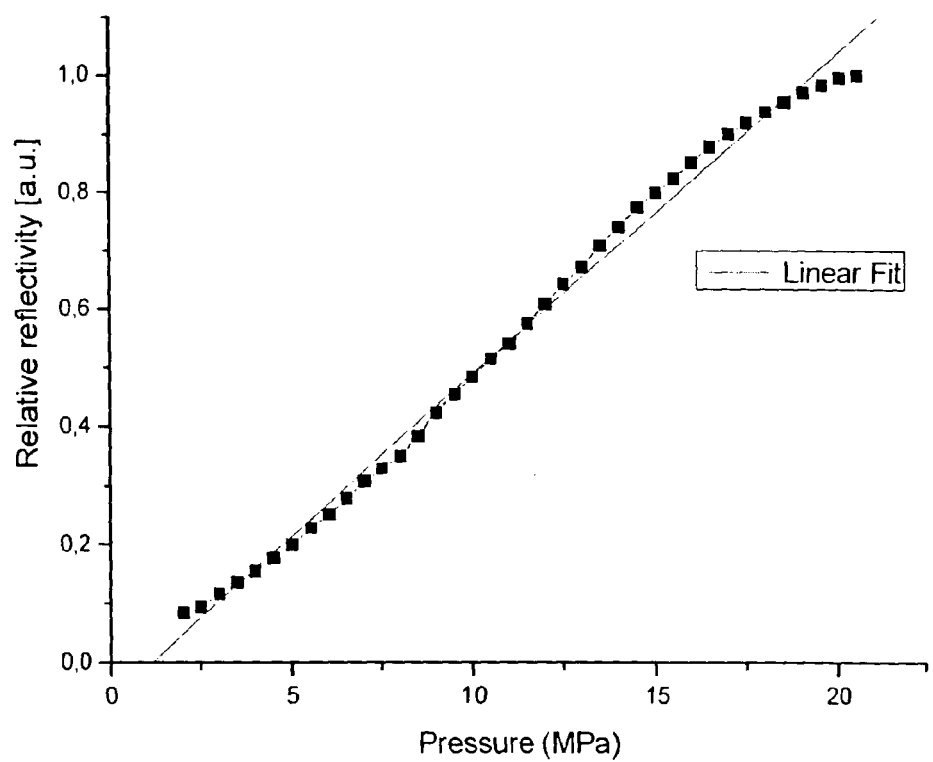
FIG. 10 is a graph showing the relative intensity response to pressure of an optical sensor manufactured according to an embodiment of the present invention where only a mechanical polishing of the diaphragm was performed after the last cleave.

FIG. 10 demonstrates the typical relative intensity change with pressure (in the 0-20 MPa pressure range) for a sensor obtained according to an embodiment of the present invention. A 1550 nm tunable laser source, an optical coupler and a light detector were used to measure this response. The fiber optical element used for manufacturing the sensor was a step index multimode fiber that contained about 15 mol % $GeO_2$ in its core. The core diameter was 62 μm with the fiber outer diameter of 125 μm. The optical element was etched in HF until a cavity of a depth of about 20 μm was formed. The etched first end was then spliced to a standard single-mode lead fiber. The optical element was then cleaved about 10 μm away from its second end, and then polished to further reduce the diaphragm thickness to approximately 3 μm.

Figure 11:
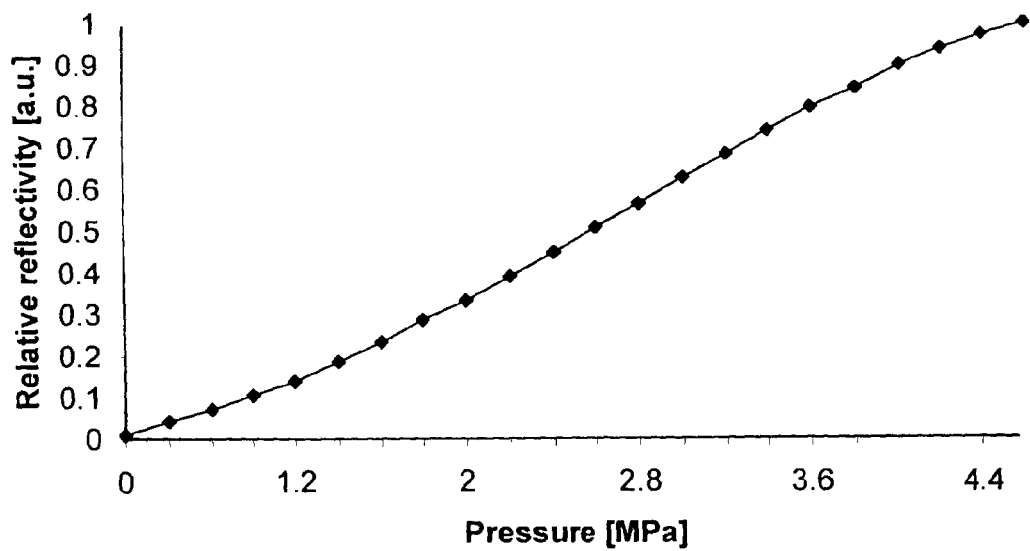
FIG. 11 is a graph showing the relative intensity response to pressure of an optical sensor manufactured according to an embodiment of the present invention where a mechanical polishing of the diaphragm was first performed after the last cleave, followed by a controlled chemical etching.

FIG. 11 shows the relative intensity change with pressure (in the 0-4.5 MPa pressure range) of an optical sensor obtained by the same procedure as described in the previous paragraph, with the exception that after polishing of the diaphragm the second end of the optical element was further etched chemically. The precise control over the diaphragm thickness was achieved by enclosing the etching solution (2% HF) and the sensor into a pressure vessel. The sensor was connected to an interrogation system via lead optical fiber and the pressure in the vessel was continuously cycled within the target sensor sensitivity range. It should be noted that it is usually not necessary to cover the full pressure range of the sensor in order to evaluate a change in its sensitivity: a partial range is acceptable (usually lower pressures are easier to implement). The response (sensitivity) of the sensors was continuously observed by the interrogation system and when the sensor achieved the desired sensitivity, i.e. diaphragm with the appropriate thickness or mechanical properties, the etching was stopped by removal of the sensor from the etching medium and neutralization of the sensor tip. This process advantageously allows for a precise tuning of the sensor to the desired pressure range and sensitivity and also allows for repeatable production results with acceptable yields.

Figure 12:
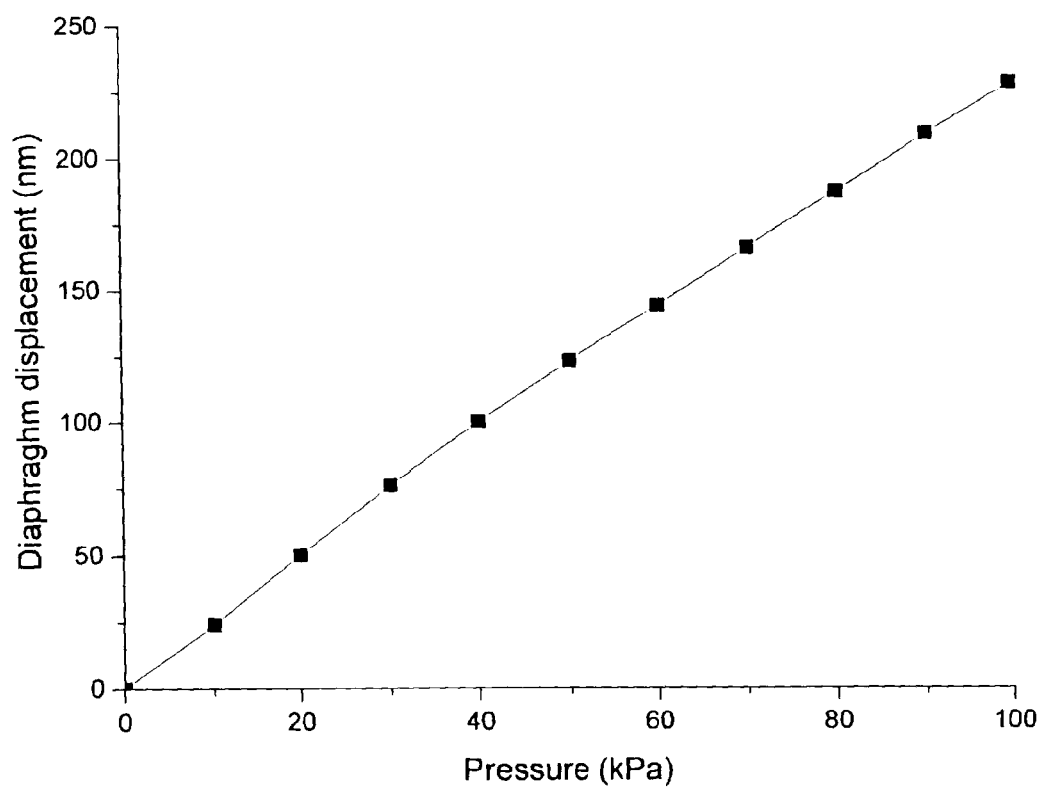
FIG. 12 is a graph showing the cavity length change in response to pressure of an even more sensitive optical sensor manufactured according to the same method as for the sensor of FIG. 11.

FIG. 12 finally shows the cavity length change with pressure of a more sensitive sensor using 125 μm multimode lead fiber obtained by the same procedure as described in the previous paragraph, but for an unambiguous pressure range of 0-100 kPa. Such cavity length changes were measured using commercial white light Fabry-Perot interferometer. It is worth mentioning that sensitive sensors obtainable through the present invention could have flat and thin surfaces such as the preferred embodiments described in FIGS. 1 and 2. The preferred embodiments described in the FIGS. 3 and 4 will give a lower sensitivity. However they can be made out of standard nearly parabolic multimode fibers and might be more robust than the other ones and thus they may be perfectly suitable for applications involving extreme pressure and temperature.

Of course, numerous modifications could be made to the embodiments described above without departing from the scope of the invention as defined in the appended claims.

The invention claimed is:

1. A method for manufacturing an optical sensor for sensing a parameter, said method comprising the steps of:
   a) providing an optical element of similar transversal dimensions than a lead optical fiber, said optical element being composed of a single piece and having a first and a second end;
   b) shaping the first end of the optical element to define a cavity therein opened on said first end;
   c) permanently joining said first end of the optical element to a forward end of a lead optical fiber so that said optical element is supported by said lead optical fiber and projects strictly forward therefrom; and
   d) shaping the second end of said optical element to define a diaphragm extending across said cavity, said diaphragm being flexible in response to said parameter, said diaphragm defining a first reflector of a sensing Fabry-Perot resonator within said optical sensor.

2. The method according to claim 1, wherein the optical element provided in step a) is composed of a length of optical fiber having a core and a cladding.

3. The method according to claim 2, wherein said optical element is a multi-mode graded index or step index optical fiber.

4. The method according to claim 1, wherein the shaping of step b) comprises a sub-step of etching the first end of the optical element, said optical element having an etchability profile selected to define said cavity through said etching.

5. The method according to claim 4, wherein said etchability profile is determined by a distribution of dopants in said optical element.

6. The method according to claim 5, wherein the optical element comprises a length of fiber having an inner portion and an outer portion, said outer portion having an etchability rate lesser than an etchability rate of said inner portion.

7. The method according to claim 6, wherein said distribution of dopants comprises at least one doping element doping at least one of said inner portion and said outer portion.

8. The method according to claim 7, wherein said at least one doping element is selected from the group consisting of $GeO_2$, $TiO_2$, $P_2O_5$, $Al_2O_3$ and $B_2O_3$.

9. The method according to claim 4, wherein said etching sub-step of step b) comprises immersing said first end of the optical element into an etching medium in a liquid or gaseous phase.

10. The method according to claim 1, further comprising a step prior to step c) of coating a forward end face of the lead optical fiber with a partially reflective layer.

11. The method according to claim 10, wherein said partially reflective layer is selected from the group consisting of thin metallic coatings and oxide coatings.

12. The method according to claim 1, further comprising a step between step b) and step c) of coating an inner surface of said cavity with a at least partially reflective layer.

13. The method according to claim 12, wherein said at least partially reflective layer is selected from the group consisting of thin metallic coatings and oxide coatings.

14. The method according to claim 1, further comprising a step between step b) and step c) of polishing said first end of the optical element.

15. The method according to claim 1, further comprising a step between steps b) and c) of:
providing a spacer element at the forward end of said lead optical fiber; and
shaping said spacer element to form a hollow spacer.

16. The method according to claim 15, wherein said providing a spacer element comprises defining said spacer element as a portion of said lead optical fiber.

17. The method according to claim 15, wherein said providing a spacer element comprises permanently joining said spacer element to a forward end face of said lead optical fiber.

18. The method according to claim 15, wherein said step of shaping the spacer element comprises the sub-steps of:
i) etching a forward end of the spacer element to remove a central section thereof, thereby exposing a forward end face of the lead optical fiber; and
ii) coating said forward end of the spacer element and said exposed forward end face of the lead optical fiber with a partially reflective coating.

19. The method according to claim 18, wherein said step of shaping the spacer element further comprises a substep of iii) polishing said forward end of the spacer element.

20. The method according to claim 1, wherein the permanently joining of step c) comprises fusion splicing said first end of the optical element to said lead optical fiber.

21. The method according to claim 1, wherein the shaping of step d) comprises a sub-step of cleaving the second end of the optical element to a pre-determined length.

22. The method according to claim 1, wherein the shaping of step d) comprises a sub-step of polishing the second end of the optical element.

23. The method according to claim 22, wherein said polishing sub-step comprises monitoring an optical signal propagating in said optical sensor as said second end of the optical element is being polished.

24. The method according to claim 22, wherein said polishing sub-step is carried out in a pressurized vessel.

25. The method according to claim 1, wherein the shaping of step d) comprises a sub-step of etching the second end of the optical element.

26. The method according to claim 25, wherein said etching sub-step of step d) comprises monitoring an optical signal propagating in said optical sensor as said second end of the optical element is being etched.

27. The method according to claim 25, wherein said etching sub-step of step d) is carried out in a pressurized vessel.

28. The method according to claim 25, wherein said optical element has an etchability profile selected so that said etching sub-step of step d) results in a corrugated profile of said diaphragm.

29. The method according to claim 25, wherein said optical element has an etchability profile selected so that said etching sub-step of step d) forms a protuberance at a central portion of said diaphragm.

30. The method according to claim 25, wherein said optical element has an etchability profile selected so that said etching sub-step of step d) forms a protective hollow member projecting forward of said diaphragm.

31. The method according to claim 21, wherein the shaping of step d) comprises, after said cleaving sub-step, a sub-step of polishing said second end of the optical element.

32. The method according to claim 31, wherein the shaping of step d) comprises, after said polishing sub-step, a sub-step of etching said second end of the optical element.

33. The method according to claim 21, wherein the shaping of step d) comprises, after said cleaving sub-step, a sub-step of etching said second end of the optical element.

34. The method according to claim 1, further comprising an additional step of e) packaging said optical sensor in a protective tubing.

35. The method according to claim 34, wherein said step e) further comprises filling said protective tubing with a medium having at least one of transducing properties and protective properties.

36. The method according to claim 1, further comprising an additional step of coating at least said diaphragm with a protective material.

37. An optical sensor for sensing a parameter, said optical sensor comprising:
a lead optical fiber having an end surface at a forward end thereof;
a single piece optical element of similar transversal dimensions than the lead optical fiber, having a first end defining a spacer permanently joined to said forward end of the lead optical fiber and being supported by said lead optical fiber end surface so as to project strictly forward therefrom, said spacer defining a cavity therein, said optical element having a second end defining a diaphragm extending across said cavity, said diaphragm being flexible in response to said parameter, said diaphragm and said end surface of the lead optical fiber defining a first and a second reflector of a sensing Fabry-Perot resonator within said optical sensor.

38. The optical sensor according to claim 37, further comprising a semi-reflective layer coating the end surface of the lead optical fiber.

39. The optical sensor according to claim 37, wherein said optical element has a diameter substantially equal to a diameter of said lead optical fiber.

40. The optical sensor according to claim 37, wherein said optical element has a diameter greater than a diameter of said lead optical fiber.

41. The optical sensor according to claim 37, wherein said optical element has a diameter smaller than a diameter of said lead optical fiber.

42. The optical sensor according to claim 37, further comprising an additional spacer between said optical element and said lead optical fiber.

43. The optical sensor according to claim 37, wherein said optical element is made of at least one inorganic material.

44. The optical sensor according to claim 43, wherein said inorganic material is selected from the group consisting of pure silica glass, doped silica glass, composite glass and sapphire.

45. The optical sensor according to claim 37, further comprising an at least partially reflective layer coating an inner surface of said diaphragm.

46. The optical sensor according to claim 37, wherein said diaphragm has a corrugated profile.

47. The optical sensor according to claim 37, wherein said diaphragm comprises protuberance projecting from a central portion thereof.

48. The optical sensor according to claim 47, wherein said protuberance is defined by a thickness of said diaphragm within said central portion.

49. The optical sensor according to claim 47, wherein said protuberance projects both forward and rearward of said diaphragm.

50. The optical sensor according to claim 37, wherein said second end of the optical element further defines a hollow member projecting forward of said diaphragm.

51. The optical sensor according to claim 37, further comprising a protective tubing packaging said diaphragm, said spacer and at least a portion of said lead optical fiber.

52. The optical sensor according to claim 51, wherein said protective tubing is filled with a medium having at least one of transducing properties and protective properties.

53. The optical sensor according to claim 52, wherein said medium is a liquid substance, said liquid substance being trapped in said protective tubing through at least one of surface tensions and capillary effects.

54. The optical sensor according to claim 37, further comprising a protective material coating at least said diaphragm, said medium having at least one of transducing properties and protective properties.

55. The optical sensor according to claim 37, wherein said parameter is selected from the group consisting of force, acceleration, acoustic waves, vibrations and combinations thereof.

56. The optical sensor according to claim 37, wherein said parameter is pressure.

57. The optical sensor according to claim 37, wherein said first reflector of the sensing Fabry-Perot resonator is defined by a rear surface of said diaphragm.

58. The optical sensor according to claim 37, wherein said first reflector of the sensing Fabry-Perot resonator is defined by a front surface of said diaphragm.

* * * * *